H. B. LINDSAY.
COMBINED MOTOR AND PUMP.
APPLICATION FILED AUG. 9, 1921.
1,433,733.
Patented Oct. 31, 1922.
2 SHEETS—SHEET 1.
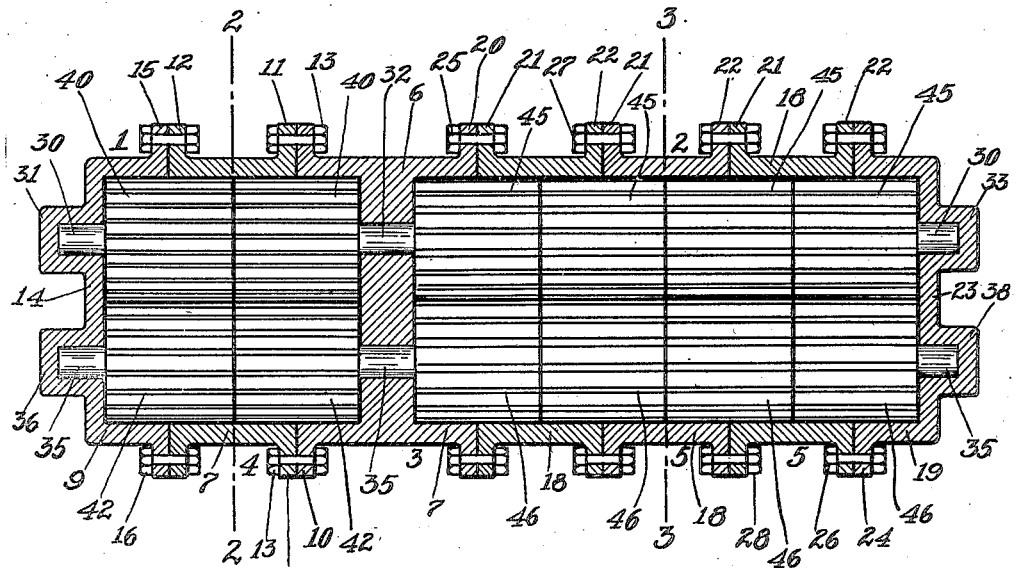
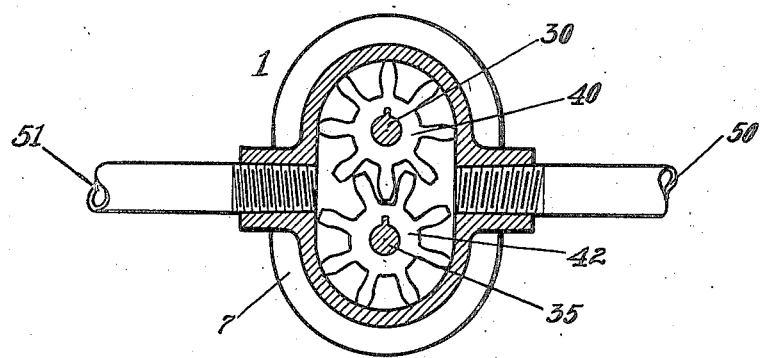
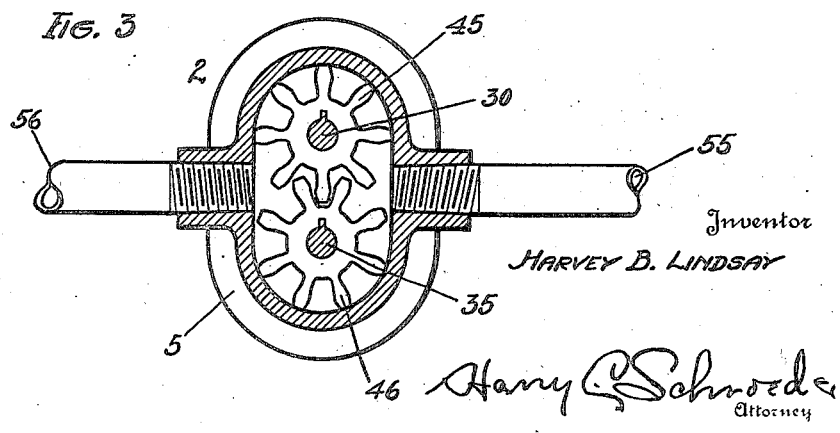
Inventor
HARVEY B. LINDSAY
Harry C. Schroeder
Attorney Patented Oct. 31, 1922.

1,433,733

UNITED STATES PATENT OFFICE.

HARVEY B. LINDSAY, OF OAKLAND, CALIFORNIA, ASSIGNOR TO THE DRY-ZERO CORPORATION, OF OAKLAND, CALIFORNIA, A CORPORATION OF CALIFORNIA.

COMBINED MOTOR AND PUMP.

Application filed August 9, 1921. Serial No. 490,903.

*To all whom it may concern:*

Be it known that I, HARVEY B. LINDSAY, a citizen of the United States, residing at Oakland, in the county of Alameda and State of California, have invented certain new and useful Improvements in Combined Motors and Pumps, of which the following is a specification.

My invention is a combined motor and pump, the object of which is to provide an inexpensive and simple device which is particularly adapted for the circulation of brine in a refrigeration system.

The parts of the motor and pump have been so designed that they may be die cast to reduce the cost of manufacture.

A further object is to provide a means whereby the sizes of the motor and pump may be varied, that is, the units of the mechanism are identical so that others may be readily added to or taken from the device.

This pump will be particularly useful for small refrigeration systems, where water power is inexpensive, and where the stability and maintenance cost of the device is a large item.

Referring to the annexed drawing in which my invention is illustrated and which forms a part of this specification:

Figure 1 is a longitudinal section of my motor and pump.

Figure 2 is a cross section of the motor taken on line 2—2 of Figure 1.

Figure 3 is a cross section of the pump taken on line 3—3 of Figure 1.

Figure 4:
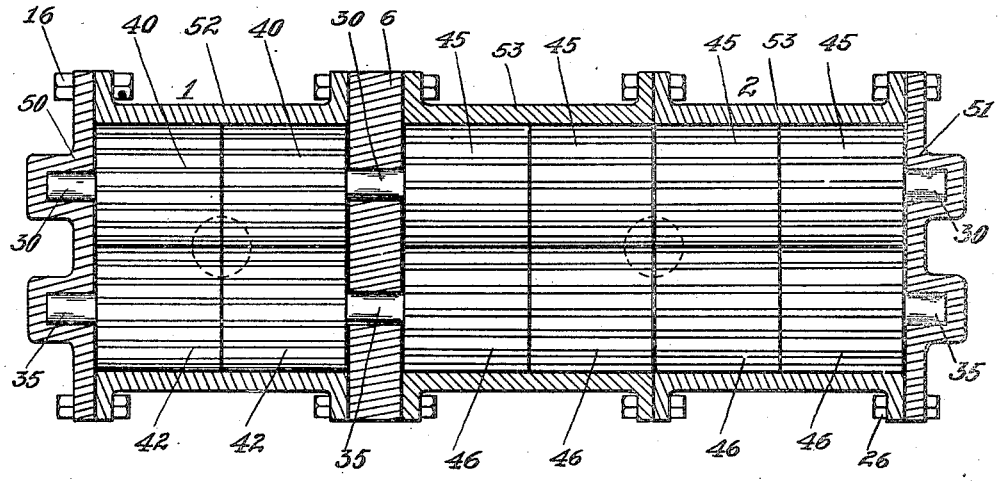
Figure 4 is a longitudinal sectional view of a modified form of my invention.

In the drawing 1 indicates the motor and 2 the pump of my combined motor and pump. A casing 3 comprises a motor casing 4 and a pump casing 5, a partition 6 forming one end wall of the motor casing and pump casing and dividing the same. The motor casing is formed of a plurality of sections 7, 8, and 9, the section 7 being integral at one end with the partition 6. An external flange 10 is formed on the end of the section 7. The section 8 is open at its ends and external flanges 11 and 12 are formed on its ends. The flanges 10 and 11 are bolted together by bolts 13, thus bolting the sections 7 and 8 together. The section 9 has an end wall 14 and an external flange 15 at its other end, said end wall forming the outer head of the pump casing 4. The flanges 12 and 15 are bolted together by bolts 16, thus bolting the sections 7 and 9 together. The pump casing 5 is formed of a plurality of sections 17, 18 and 19, the section 17 being integral at one end with the partition 6. An external flange 20 is formed on the other end of the section 17. Flanges 21 and 22 are formed externally on the respective ends of the casing sections 18. The section 19 has an end wall 23 at one end and an external flange 24 at its other end. The flange 21 of the innermost section 18 is bolted to the flange 20 of the section 17 by bolts 25, thus bolting said section to the section 17. The flange 22 of the outermost section 18 is bolted to the flange 24 of section 19 by bolts 26, thus bolting said sections together. The flanges 21 and 22 of the intermediate section 18 are respectively bolted to the flanges 22 and 21 of the innermost and outermost sections 18, by bolts 27 and 28. A shaft 30 extends longitudinally through the upper part of the casing 3 and through partition 6 and is journaled in bearings 31, 32 and 33, in the end wall 14 of section 9, in partition 6, and in the end wall 23 of the section 19 respectively. A shaft 35 extends longitudinally through the lower part of the casing 3 and through partition 6 and is journaled in bearings 36, 37 and 38 in the end wall 14 of section 9, in partition 6, and in the end wall 23 of section 19 respectively. On the shaft 30 in the motor casing 4 are keyed two gears 40 which respectively mesh with two gears 42 keyed on shaft 35 also within the motor casing, said gears forming the motor pistons. On the shaft 30 within the pump casing 5 are keyed four gears 45 which respectively mesh with four gears 46 keyed on shaft 35 also within the pump casing. The motor casing 4 is provided with an inlet 50 in one side and an outlet 51 in its other side opposite the point of mesh of the teeth of gears 40 and 42. The pump casing 5 has an inlet 55 in one side and an outlet 56 in its other side opposite the point of mesh of the teeth 45 and 46.

While I have shown two gears 40 and two gears 42 in the motor 1, I may use only one of said gears or more than two, simply by taking out the casing section 8 and bolting the sections 7 and 9 together or by putting in more than one of said sections.

While I have shown four gears 45 and four gears 46 in the pump, I may use only one of said gears or more than four simply by taking out the sections 18 and bolting the sections 17 and 19 together or by adding more sections 18.

The sections of the motor and the pump are bolted together midway between the ends of the gears.

In the modified form of my invention shown in Figure 4 the end sections 50 and 51, for purposes of each in die casting, are flanged to fit the intermediate motor sections 52 and pump sections 53 respectively. The partition 6 is also extended to form flanges to which the sections 52 and 53 are secured.

Figure 5:
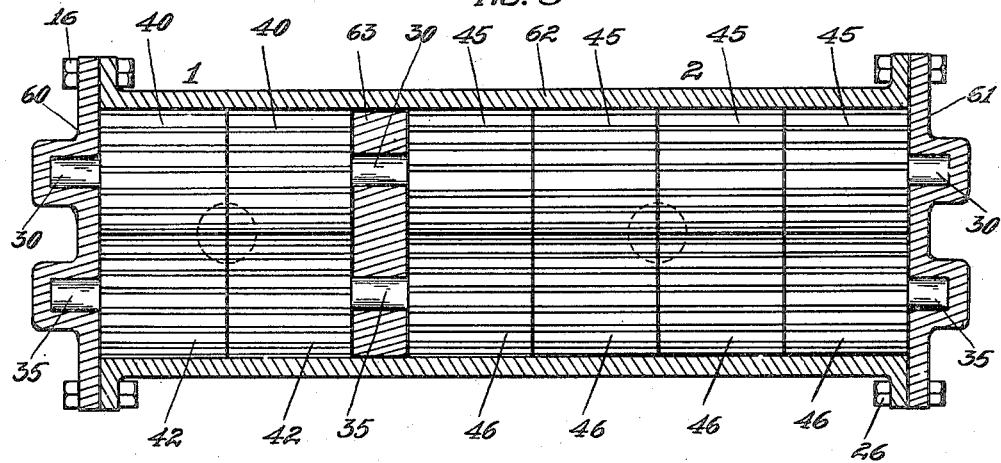
Figure 5 is a longitudinal sectional view of a further modified form of my invention.

In the modified form shown in Figure 5, the end sections 60 and 61 are extended to form flanges for the casing 62. The said casing is formed in one piece to extend the length of the motor and pump and is flanged to be secured to the end sections 60 and 61. The partition 63 is a disc to be inserted between the motor and pump, and forms a bearing for the shafts 30 and 35.

Having described my invention, I claim:

A combined motor and pump comprising a motor casing, a pump casing, said casings being made in sections extending longitudinally whereby the casings may be increased or decreased in length by varying the number of sections, two shafts extending through both of said casings and journaled therein, a plurality of gears journaled on each of said shafts within both of said casings, the gears keyed on each shaft meshing respectively with gears on the other shaft, each of said casings having an inlet and an outlet in its side walls opposite the point of mesh of the gears.

In testimony whereof I affix my signature.

HARVEY B. LINDSAY.